United States Patent [19]
Dawe et al.

[11] Patent Number: 5,697,863
[45] Date of Patent: Dec. 16, 1997

[54] EXTENDED LIFE INFINITELY VARIABLE TRACTION ROLLER TRANSMISSION WITH DIFFERENT TORIC TRACTION ROLLER DISKS

[75] Inventors: Daniel J. Dawe; Charles E. Kraus, both of Austin, Tex.

[73] Assignee: Excelermatic Inc., Austin, Tex.

[21] Appl. No.: 611,467

[22] Filed: Mar. 4, 1996

[51] Int. Cl.[6] .................................................. F16H 61/30
[52] U.S. Cl. .............................. 476/10; 476/40; 476/42
[58] Field of Search .............................. 476/40, 10, 42, 476/46

[56] References Cited

U.S. PATENT DOCUMENTS

| | | | |
|---|---|---|---|
| 2,856,784 | 10/1958 | Weisel | 476/46 |
| 4,159,653 | 7/1979 | Koivunen | 476/42 |
| 4,576,055 | 3/1986 | Kraus | 476/40 |
| 5,299,987 | 4/1994 | Dawe | 476/40 |

FOREIGN PATENT DOCUMENTS 3002034 7/1981 Germany.

*Primary Examiner*—Charles A. Marmor
*Assistant Examiner*—David M. Fenstermacher
*Attorney, Agent, or Firm*—Klaus J. Bach

[57] ABSTRACT

In an infinitely variable traction roller transmission, wherein two toric traction disks are rotatably supported opposite one another and define a toric cavity in which at least two motion transmitting traction rollers are disposed in engagement with the two toric disks and supported by trunnions, the trunnions being pivotally supported to permit changing the ratio of motion transmission between the toric disks, the toric disks each have a different cavity radius, thus causing the circles of contact of the traction rollers with the toric disk to change as the trunnions pivot to various transmission ratio positions, thereby distributing the loads on the traction rollers over a relatively large surface area thus extending the fatigue life of the traction rollers, and consequently, of the transmission.

9 Claims, 4 Drawing Sheets

EXTENDED LIFE INFINITELY VARIABLE TRACTION ROLLER TRANSMISSION WITH DIFFERENT TORIC TRACTION ROLLER DISKS

BACKGROUND OF THE INVENTION

The invention relates to an infinitely variable traction roller transmission in which power is transmitted through traction rollers pivotally supported between toric input and output disks.

To enable such toroidal traction roller motion transmissions to transmit large torques at high speeds over a long period of time, the traction rollers are positioned inwardly of the center of the toroidal cavity between the toric disks and are engaged with the toric disks with considerable forces causing large surface loads on the traction rollers.

For transmissions of toric design, the fatigue life of the drive system is controlled by the traction roller element since the rolling contact track of the roller is in continual contact whereas the circle of rolling contact on the toric disks is continually moving across the entire surface of the disks as the motion transmission ratio is varied.

It is the object of this invention to provide a design in which the life of the power transmitting traction rollers which determine the life of the transmission, is substantially increased.

SUMMARY OF THE INVENTION

This is achieved in an infinitely variable traction roller transmission, wherein two toric traction disks are rotatably supported opposite one another on co-axial input and output shafts and define a toric cavity in which at least two motion transmitting traction rollers are supported by trunnions and disposed in engagement with the two toric disks along a circle of contact. The trunnions are pivotally supported to permit changing the ratio of motion transmission between the toric disks wherein the toric disks are dimensioned such that each has a different cavity radius, thus causing the circles of contact of each traction roller with the toric disks to move as the traction rollers pivot to different transmission ratio positions so as to distribute the surface loads over a relatively large roller surface area. This greatly extends the fatigue life of the traction roller and, consequently, of the transmission.

DESCRIPTION OF A PREFERRED EMBODIMENT

Figure 1:
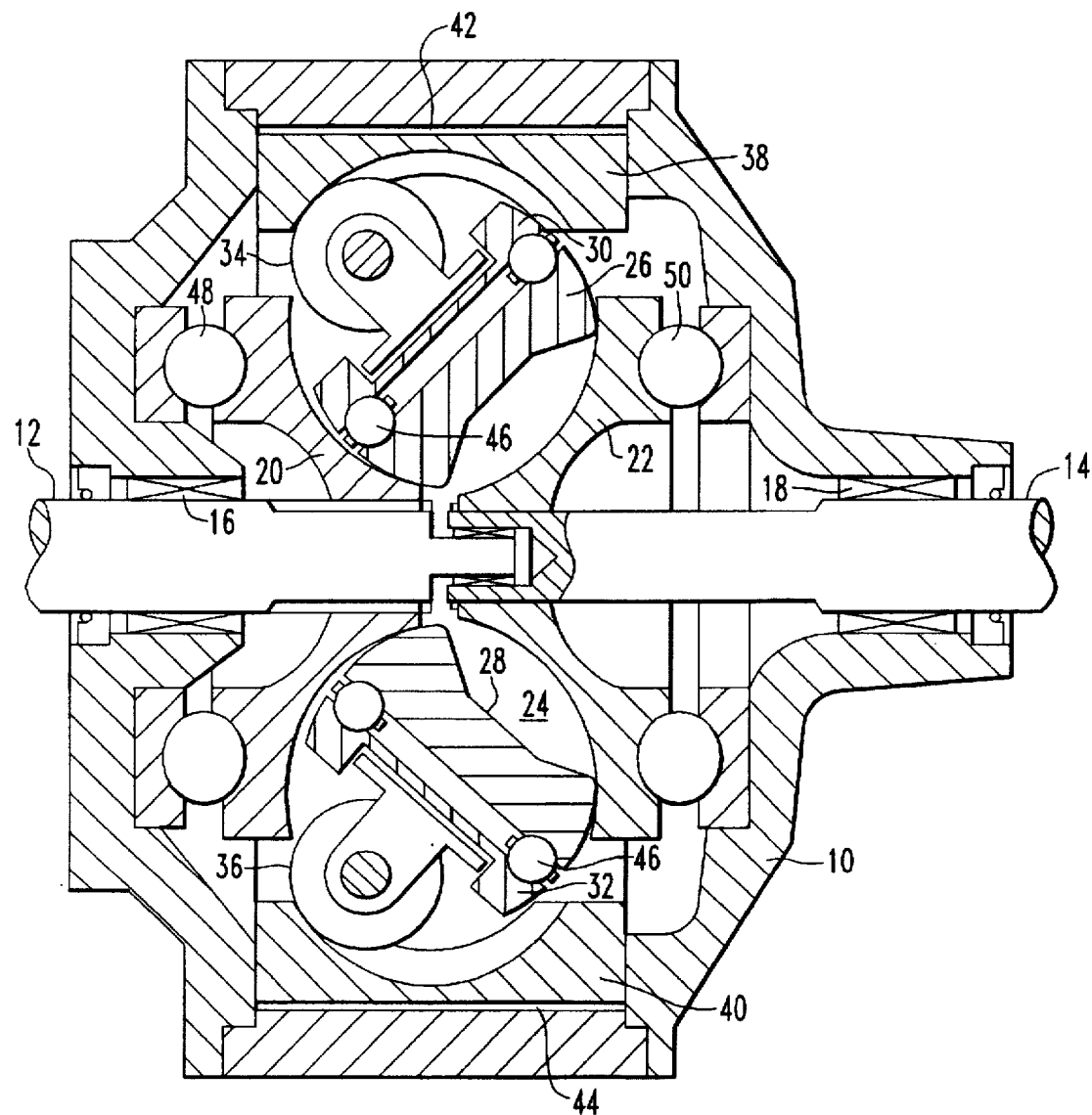
FIG. 1 is a cross-sectional view of a traction roller transmission.

A simple traction roller power transmission arrangement as shown in FIG. 1 consists of a housing 10 having coaxial input and output shafts 12, 14 rotatably supported therein by bearings 16 and 18. Associated with the input and output shafts 12, 14 are toric disks 20, 22, which are disposed opposite one another and are shaped so as to define therebetween a toric cavity 24 of essentially circular cross-section. The toric disks 20, 22 however have two slightly different cavity radii. Within the toric cavity 24, traction rollers 26, 28 are rotatably supported in engagement with the toric traction disks 20, 22.

The traction rollers 26, 28 are supported in the housing 10 by pivot trunnions 30, 32 which are pivotally supported by way of trunnion support rollers 34, 36 running on hard metal track members 38, 40 received in track cavities 42, 44 formed in the housing 10. Each of the pivot trunnions 30, 32 carries a traction roller bearing 46 for rotatably supporting the associated traction rollers 26, 28 which are forced into firm engagement with the traction disks 20 and 22 by way of the trunnion support rollers 34, 36. The traction disks 20, 22 are supported in the housing 10 by axial thrust bearings 48 and 50, respectively.

Figure 2:
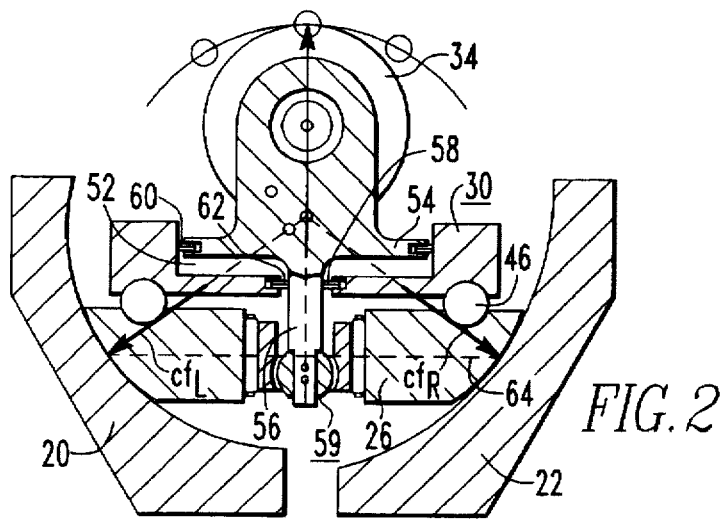
FIGS. 2, 3 and 4 are each cross-sectional views of the traction roller transmission with the traction roller shown in different pivot positions.
Figure 3:
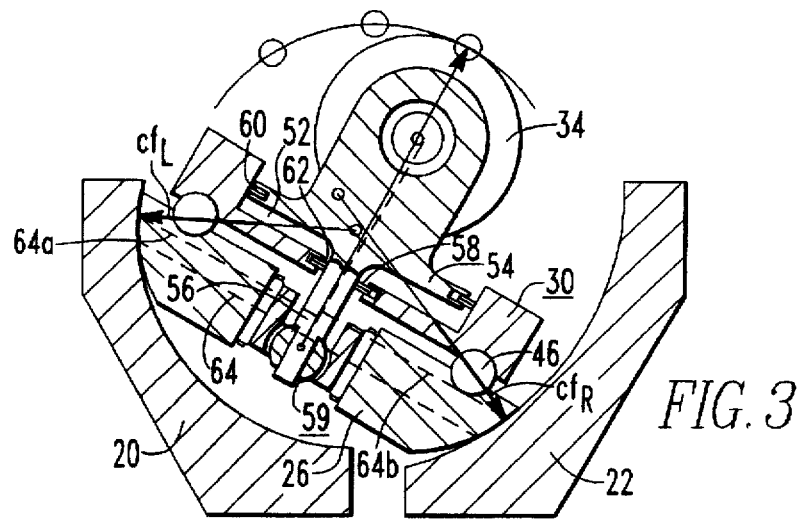
Figure 4:
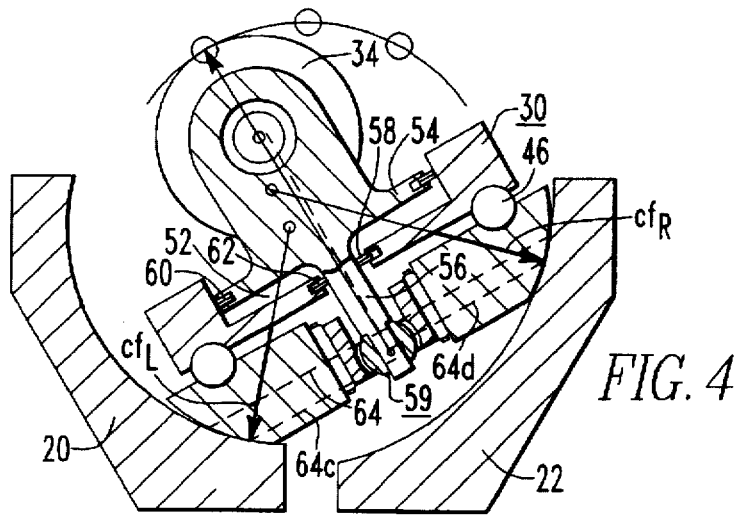

As shown in FIGS. 2–4, each of the pivot trunnions 30, 32 includes a cylinder 52 with a hydraulic trunnion piston 54 disposed therein. The pivot trunnion piston 54 carries the support roller 34. A post 56 extends from the trunnion piston 54 through an opening 58 in the trunnion cylinder 52 and is pivotally received within the traction roller 26 and engaged therein by a pivot bearing structure 59, which allows the pivot trunnion 30 to tilt slightly relative to the trunnion piston 54. This makes it possible for the traction roller to adapt to the different curvatures of the toric surfaces of the traction disks 20 and 22 in the various pivot positions of the trunnion.

The piston 54 has a relatively large play in the cylinder 52 and is provided with relatively wide seal rings 60 which are seated in deep grooves. Also the seal rings 62 in the opening 58 are relatively wide and the opening 58 is relatively large to permit the tilting of the piston 54 in the cylinder 52. Furthermore, the edges of the piston 54 may be rounded to accommodate the tilting of the piston 54 in the cylinder 52.

Hydraulic operating fluid is supplied to the cylinder 52 to force the traction roller 26, 28 into engagement with the toric disks 20, 22. The engagement forces of the traction rollers 26, 28 with the toric traction disks 20 22 depend on the loading applied by the hydraulic operating fluid.

FIGS. 2, 3, and 4 show the traction roller 26 in various engagement positions for different transmission ratios.

FIG. 2 shows the traction roller 26 in its 1:1 transmission ratio position. At this point, forces are distributed evenly, contact force left $cf_L$ and contact force right $cf_R$ being effective at the same radial location on both of the toric disks 20, 22 and the line of contact of the traction roller with the toric disks also being the same for both toric disks.

As the roller 26 pivots clockwise from the 1:1 position as shown in FIG. 2 to the position shown in FIG. 3, the circle of contact moves outwardly on the traction roller 26. However, the circle of contact 64a with the left toric disk 20 moves at a rate different from that with which the circle of contact 64b with the right toric disk 22 moves, thereby providing for two different circles of contact of the traction roller 26, one 62a with the left toric disk 20 and the other 64b with the right toric disk 22. Since forces are no longer equally distributed, a moment is generated. The tilting of the trunnion piston 31 within the cylinder 30 helps to minimize the moment created by the two different circles of contact 64a and 64b.

The circles of contact 64a and 64b move on the traction roller 26 because the toric disks 20, 22 each have a different cavity radius. The movement of the circles of contact provide for a distribution of wear over a relatively large surface area of the traction rollers 26, 28, thereby increasing the life of the traction rollers and thus the life of the transmission.

Likewise, pivoting the rollers counterclockwise from the 1:1 position, as shown in FIG. 4, creates the same effect, however, in opposite sense from the clockwise movement. Here, the traction roller 26 is in engagement with the left toric disk 20 along a circle of contact 64c and with the right toric disk 22 along a circle of contact 64d.

Figure 5:
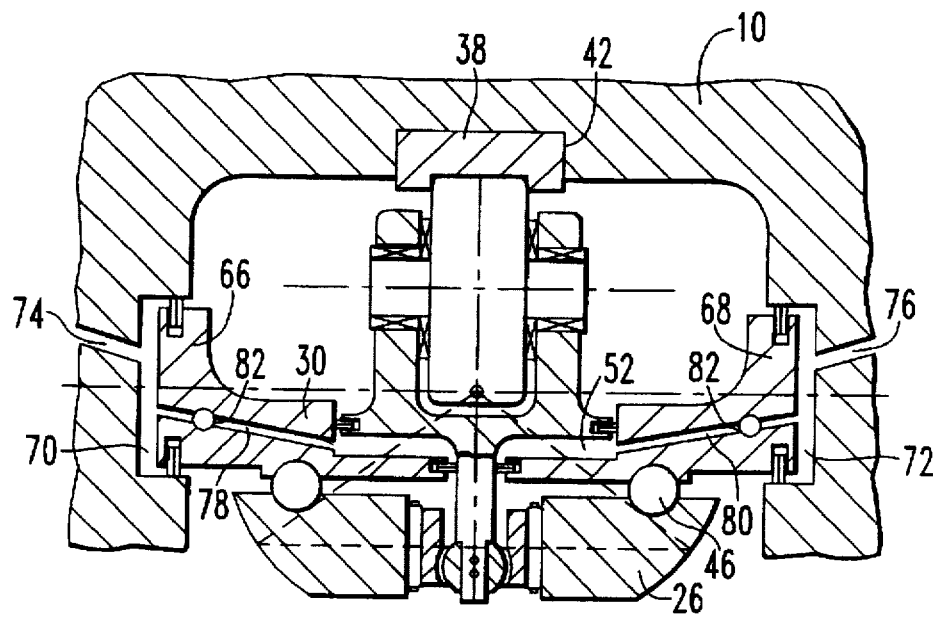
FIG. 5 is an axial cross-sectional view of a traction roller with support trunnion showing the hydraulic oil feed passages to the hydraulic cylinder of the traction roller support arrangement as shown in FIGS. 2–4.

FIG. 5 shows the traction roller supported on a trunnion corresponding to FIG. 2 but turned by 90°. It can be seen that the trunnion 30 has piston end portions 66, 68 received in housing cylinders 70, 72 to which hydraulic operating fluid (oil) under pressure is supplied through passages 74, 76. Depending on the fluid applied to the opposite piston ends 66 and 68, the trunnion is moved or tilted slightly sidewardly to initiate a change of the transmission ratio as described in U.S. Pat. Nos. 4,858,484 and 4,964,312, which are both assigned to the assignee of the present invention. From the cylinders 74, 76 the oil under pressure is fed to the hydraulic cylinder 52 through passages 78, 80 each of which includes a check valve 82.

FIGS. 6–9 illustrate another embodiment of the invention. In this embodiment the traction roller 26 is again supported in the housing 10 by a pivot trunnion 30 which is pivotally supported by way of a trunnion support roller 34. Track cavities 42 formed in the housing 10 receive the hard metal track members 38 on which the support rollers 34 run. However, the pivot trunnion 30' includes a hydraulic cylinder portion 84. Disposed within the cylinder portion 84 of the trunnion 30' is a hydraulic load piston 86. Preferably, the outer side of the piston is axially curved. A swivel post 56' extends from the trunnion 30' through an opening 58' in the center of the hydraulic load piston 86 ending in the center of the traction roller 26 where it is provided with a bearing support structure 59' engaging the traction roller 26. Although the post 56' engages the traction roller 26, it allows the traction roller 26 and the load piston 86 to swivel slightly with respect to the trunnion 30 so as to permit the traction roller 26 to adapt to the differently curved traction disks 20,22.

Figure 9:
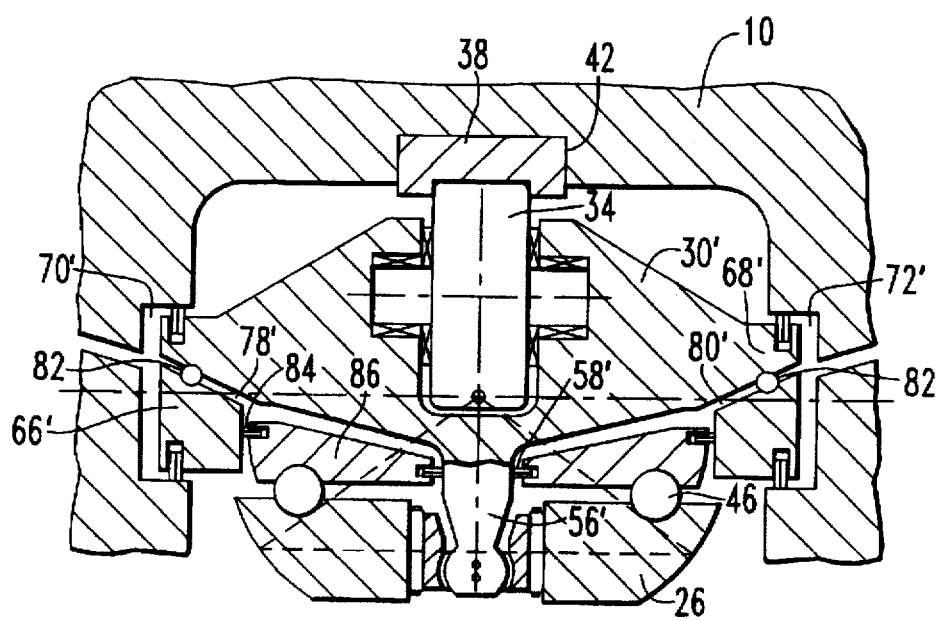
FIG. 9 shows a trunnion with a traction roller and, in the trunnion, hydraulic fluid feed passages for supplying hydraulic fluid to the hydraulic cylinder of the traction roller support arrangement as shown in FIGS. 6–8.
Figure 6:
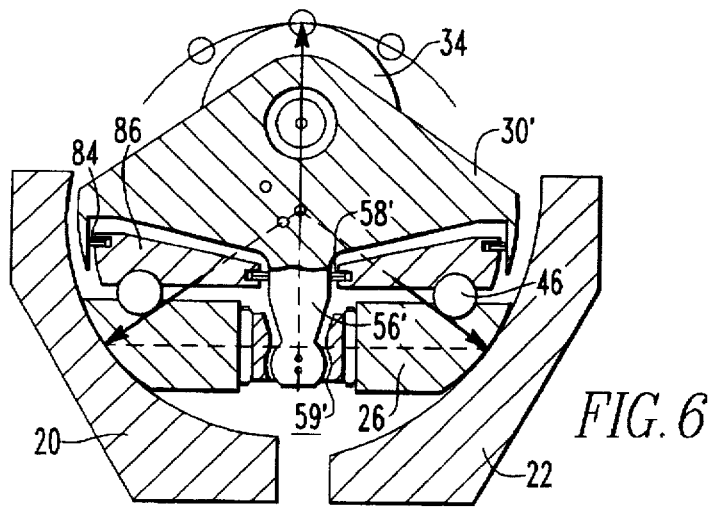
FIGS. 6, 7 and 8 are views of another embodiment of the traction roller transmission showing a traction roller in different engagement positions (however, the same positions as in FIGS. 2–5)
Figure 7:
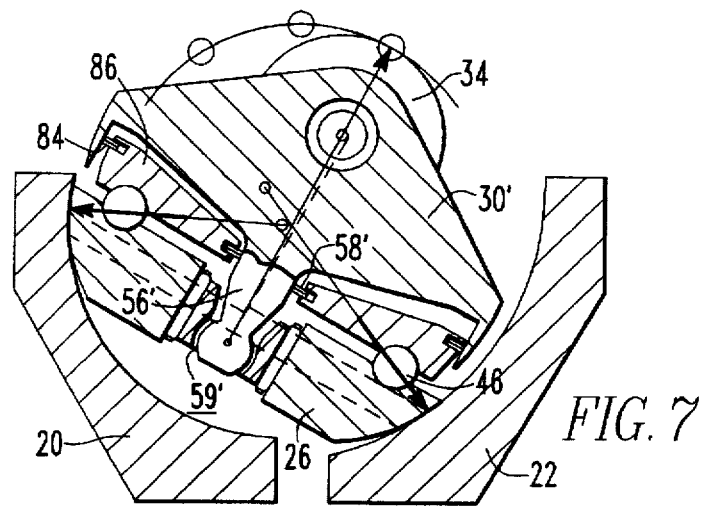
Figure 8:
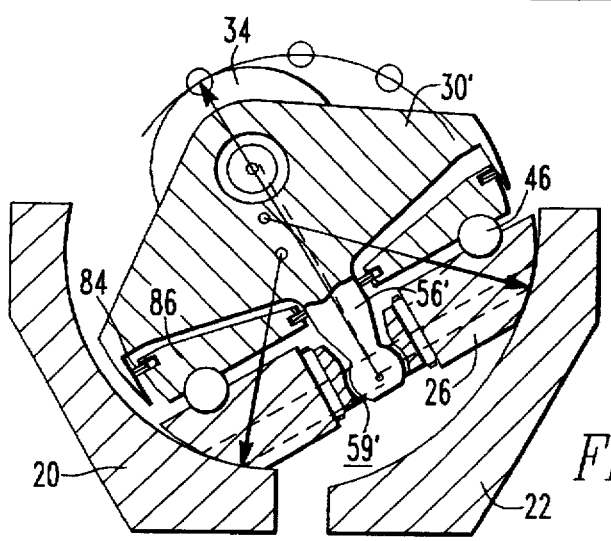

FIGS. 7 and 8 further illustrate the traction roller in different positions similar to those shown in FIGS. 3 and 4. FIG. 9 is comparable to FIG. 5, showing hydraulic oil passages 78', 80' with check valves 82 and trunnion piston ends 66', 68' disposed in housing cylinders 70', 72'.

With the arrangement according to the invention wear of the traction rollers is substantially reduced and the life span of the traction rollers and, consequently, of the transmission is substantially increased as the traction rollers are loaded not only along one particular line of contact. As explained, the lines of contact of the traction rollers with the traction disks change with the transmission ratio so that the traction roller surface load is distributed over most of the traction roller surface. Preferably, the toric disk with the smaller curvature radius, in the figures toric disk 20, is mounted on the input shaft since, generally, the transmission is used in an over-all speed reducing arrangement.

What is claimed is:
1. An infinitely variable traction roller transmission comprising:
 a support structure; first and second toric disks rotatably supported by said support structure so as to be disposed opposite each other, one of said two toric disks being mounted for rotation with an input shaft and the other of said two toric disks for rotation with an output shaft, said toric disks having opposite traction surfaces of constant radius in an axial cross-sectional plane and defining a toric cavity therebetween, at least two motion transmitting traction rollers arranged in said toric cavity in radial symmetry and being pivotally supported in said toric cavity so as to provide for a variable ratio of motion transmission between said toric disks; said toric disks being dimensioned such that one of said toric discs has a larger radius cavity curvature than the other so as to provide for different circles of contact of said traction rollers with said toric disks in different angular pivot positions of said traction rollers.

2. An infinitely variable traction roller transmission according to claim 1, wherein said traction roller is supported on said pivot trunnion by a hydraulic cylinder and piston structure and means are provided for supplying pressurized hydraulic fluid to said hydraulic cylinder and piston structure to cause engagement of said traction roller with said toric disks with a force corresponding to the pressure of the hydraulic fluid supplied to said hydraulic cylinder and piston structure.

3. An infinitely variable traction roller transmission according to claim 2, wherein said piston has seal surfaces which are rounded in the direction of the axis of said piston so as to facilitate tilting of said piston in said cylinder.

4. An infinitely variable traction roller transmission according to claim 1, wherein the toric disk with the smaller cavity radius is mounted on said input shaft and the toric disk with the larger cavity radius is mounted on said output shaft.

5. An infinitely variable traction roller transmission according to claim 2, wherein the cylinder of said hydraulic cylinder and piston structure is formed in said trunnion and a piston received therein forms a roller bearing structure for said traction roller.

6. An infinitely variable traction roller transmission according to claim 5, wherein said cylinder includes a post extending through said piston and having a traction roller engagement head received in said traction roller so as to provide swivel support for said traction roller.

7. An infinitely variable traction roller transmission according to claim 5, wherein said piston is part of said trunnion and is received in a cylinder forming a roller bearing structure for supporting said traction roller.

8. An infinitely variable traction roller transmission according to claim 7, wherein said piston includes a post extending through said cylinder and having a traction roller engagement head received in said traction roller so as to provide swivel support for said traction roller.

9. An infinitely variable traction roller transmission according to claim 8, wherein said post is sealed against said cylinder and piston structure by a seal ring received in a groove with sufficient radial play to permit swiveling of said traction roller bearing structure with regard to said post.

* * * * *